(12) United States Patent
Bonzi

(10) Patent No.: US 10,482,500 B1
(45) Date of Patent: Nov. 19, 2019

(54) AUTOMATICALLY GENERATING BOTH RICH ADVERTISING MESSAGES AND ASSOCIATED LANDING PAGES USING SOCIAL MEDIA PLATFORM CONTENT

(71) Applicant: 2KDirect, LLC, San Luis Obispo, CA (US)

(72) Inventor: Joe Bonzi, San Luis Obispo, CA (US)

(73) Assignee: 2KDirect, LLC, San Luis Obispo, CA (US)

( * ) Notice: Subject to any disclaimer, the term of this patent is extended or adjusted under 35 U.S.C. 154(b) by 0 days.

(21) Appl. No.: 15/364,084

(22) Filed: Nov. 29, 2016

Related U.S. Application Data

(60) Provisional application No. 62/404,048, filed on Oct. 4, 2016.

(51) Int. Cl.
*G06Q 30/00* (2012.01)
*G06Q 30/02* (2012.01)
*H04L 12/58* (2006.01)
*G06Q 50/00* (2012.01)

(52) U.S. Cl.
CPC ..... *G06Q 30/0255* (2013.01); *G06Q 30/0277* (2013.01); *H04L 51/32* (2013.01); *G06Q 50/01* (2013.01)

(58) Field of Classification Search
USPC .......................................................... 705/14
See application file for complete search history.

(56) References Cited

U.S. PATENT DOCUMENTS

| | | | |
|---|---|---|---|
| 2009/0012863 A1* | 1/2009 | Saephan | G06Q 30/02 705/14.54 |
| 2011/0276397 A1* | 11/2011 | Moxley | G06Q 30/02 705/14.52 |
| 2016/0080485 A1* | 3/2016 | Hamedi | H04L 67/02 709/204 |
| 2016/0308880 A1* | 10/2016 | Biesecker | G06Q 10/101 |
| 2017/0161452 A1* | 6/2017 | Bain | G06F 19/3431 |

* cited by examiner

*Primary Examiner* — Alvin L Brown
(74) *Attorney, Agent, or Firm* — Perkins Coie LLP

(57) ABSTRACT

A facility for automatically generating an advertising message and an associated a landing page is described. The facility solicits from the user information relating to a company. The facility accesses a social media platform to identify the company having a presence on the social media platform with whom the solicited information is associated. The facility retrieves content from the identified company's presence on the social media platform. The facility uses this retrieved content to (1) construct the webpage for the identified company, and (2) construct and advertising message for the identified company containing a link to the constructed webpage.

22 Claims, 16 Drawing Sheets

AUTOMATICALLY GENERATING BOTH RICH ADVERTISING MESSAGES AND ASSOCIATED LANDING PAGES USING SOCIAL MEDIA PLATFORM CONTENT

CROSS-REFERENCE TO RELATED APPLICATION(S)

This application claims the benefit of priority to U.S. Provisional Patent Application No. 62/404,048 entitled "AUTOMATICALLY GENERATING BOTH RICH ADVERTISING MESSAGES AND ASSOCIATED LANDING PAGES USING SOCIAL MEDIA PLATFORM CONTENT," filed on Oct. 4, 2016, which is hereby incorporated by reference in its entirety.

This application is related to U.S. Pat. No. 9,436,953, issued on Sep. 6, 2016, which is herein incorporated in its entirety by reference.

BACKGROUND

The world wide web ("the web") permits companies and individuals to electronically publish content in the form of web pages that can be retrieved and displayed using a browser program running on a client computer system. Such "publishers" often sell to advertisers opportunities to present advertising messages together with their published content.

For example, an advertiser who is a music publisher may purchase opportunities to present an advertising message promoting a new music CD published by the publisher. The advertising message may be "rich" in a variety of ways. They may, for example, include text identifying the title of the CD and the responsible artist in a style that is visually compatible with an appealing background pattern and/or color, a series of multiple photos of the artist, a link to a web page on which the user can listen to the artist's music and purchase the CD, etc.

It is common for advertising messages to be "linked" to a web page, such that, when a user to whom an advertising message clicks on the advertising message or otherwise selects it, this web page is loaded and displayed. A web page having this role with respect to an advertising message is sometimes referred to as a "landing page" for the advertising message. To continue the example above, when a user clicks on the music CD advertising message, (also referred to as "clicking through" the advertising message), a landing page containing a track list and ordering mechanism for the music CD may be loaded and displayed.

DETAILED DESCRIPTION

Figure 1:
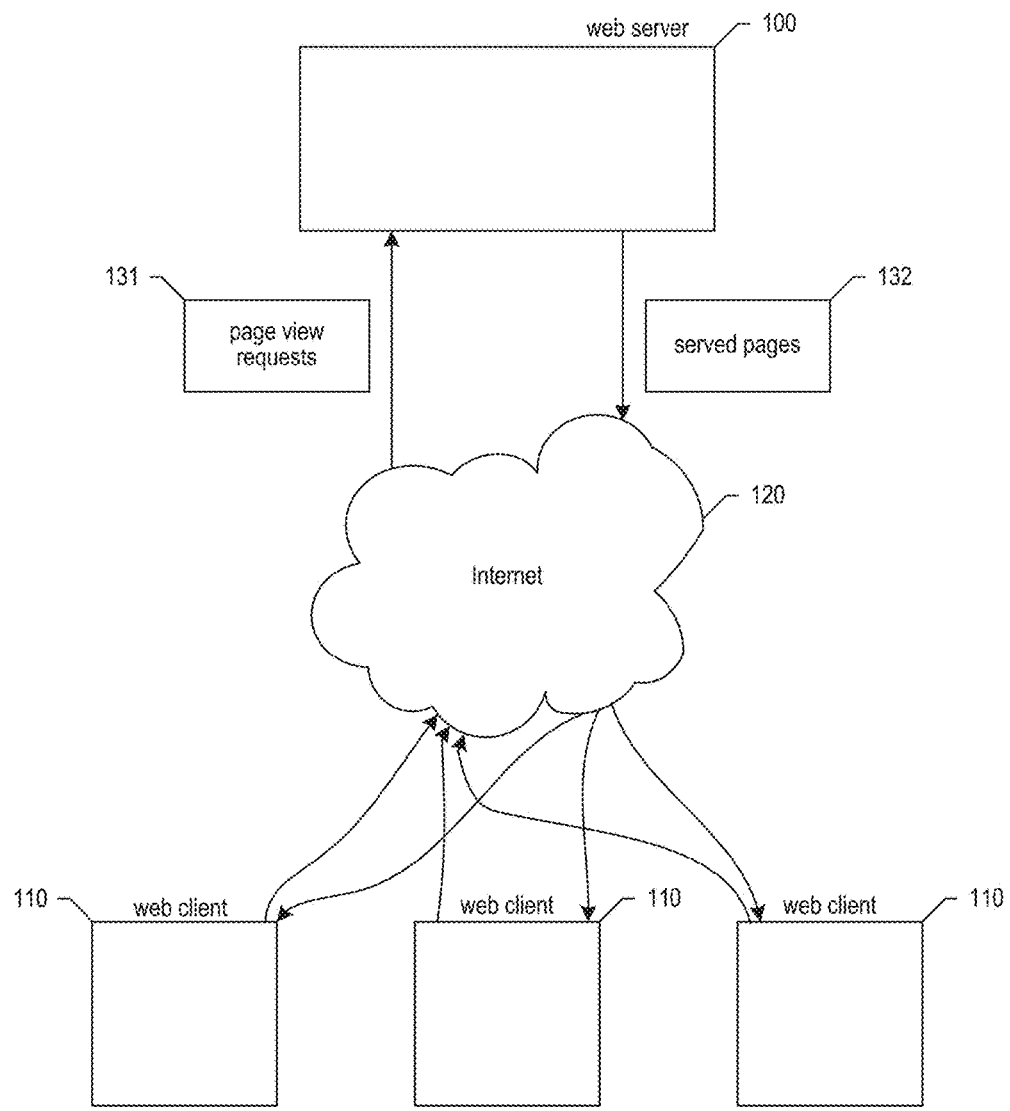
FIG. 1 is a high-level data flow diagram showing data flow within a typical arrangement of components used to provide the facility.

It is common for both rich advertising messages and landing pages to be constructed by professional web developers. The inventors have recognized that constructing rich advertising messages and landing pages this way incurs significant pecuniary and time costs. The inventors have also recognized that, when rich advertising messages and landing pages are constructed this way, the rich advertising messages and landing pages often have different appearances, as well as appearances that differ from the advertiser's other forms of online presences, producing a discordant experience for users who view and click through the advertising messages. The inventors have further recognized that conventional ways of implementing advertising messages and landing pages make it difficult to reliably track users who click through the advertising messages and their subsequent actions with respect to the advertiser.

In order to overcome these disadvantages of conventional approaches to creating rich advertising messages and their landing pages, the inventors have conceived and reduced to practice a software and/or hardware facility for automatically generating on behalf of an advertiser both one or more rich advertising messages and one or more associated landing pages ("the facility").

In some embodiments, the facility solicits from a user information identifying a business, such as its name, part of its name, the city or state where it is located, etc. The facility accesses one or more social media platforms to identify a business having a profile or other presence on at least one of the social media platforms. The facility retrieves content from these social media platform presences for incorporation into automatically-generated advertising messages and landing pages. In various embodiments, this content takes a variety of forms, including text strings, images, links to resources of various types, display colors, text fonts, audio sequences, etc. In some embodiments, the facility performs this retrieval in a "bootstrapping" manner, in which it identifies in the business's presence on an initial social media platform links to presences of the business on other social media platforms and resources of other types, such as the business's primary web page, and retrieves content from these additional social media platform presences and additional resources of other types.

The facility displays previews of the advertising messages and landing pages that are based upon portions of the retrieved content automatically selected by the facility. The facility gives the user an opportunity to adjust the selected portions of content, and see previews of the advertising messages and landing pages that are updated to reflect the adjusted selections. For example, the user can edit a description of the business retrieved from the social media platform presences; change a retrieved background color; swap out a photo; etc.

Once the user approves the previous of the advertising messages and landing pages, the facility generates the advertising messages and landing pages. These can be sized, oriented, and otherwise designed for various device types, advertising placement types, etc. In some embodiments, the facility assists the user in buying opportunities for presenting the advertising messages ("impressions"), and targeting the presentation of the advertising messages to certain publishers, users, user behavior patterns, subject matter, etc.

The facility constructs the advertising messages such that, when a user viewing one selects it, a version of the landing page appropriate to the user's device is served and displayed. The landing page typically includes links to one or more resources related to the business, such as the business's primary webpage, social media presences of the business, a map showing the business's location, etc. In some embodiments, the facility instruments these links in such a way that the facility can detect when the user follows them, and correlate such action with the initial display of the advertising message to the user, and the user's selection of the advertising message.

By operating in some or all of the ways described above, the facility significantly reduces the talent, cost, and time requirements of building and operating advertising messages and associated landing pages, providing access to this form of advertising to a wider variety of advertisers at lower cost.

FIG. 1 is a high-level data flow diagram showing data flow within a typical arrangement of components used to provide the facility. A number of web client computer systems 110 that are under user control generate and send page view requests 231 to one or more logical web servers 100 via a network such as the Internet 120. Within the web server, these requests may either all be routed to a single web server computer system, or may be loaded-balanced among a number of web server computer systems. The web server typically replies to each with a served page 132. Web servers 100 may include web servers operated by publishers of web pages that present advertising messages, are linked to from advertising messages, or both. Web servers 100 may also include one or more web servers implementing aspects of the facility.

While various embodiments are described in terms of the environment described above, those skilled in the art will appreciate that the facility may be implemented in a variety of other environments including a single, monolithic computer system, as well as various other combinations of computer systems or similar devices connected in various ways. In various embodiments, a variety of computing systems or other different client devices may be used in place of the web client computer systems, such as mobile phones, personal digital assistants, televisions and associated video sources, cameras, etc.

Figure 2:
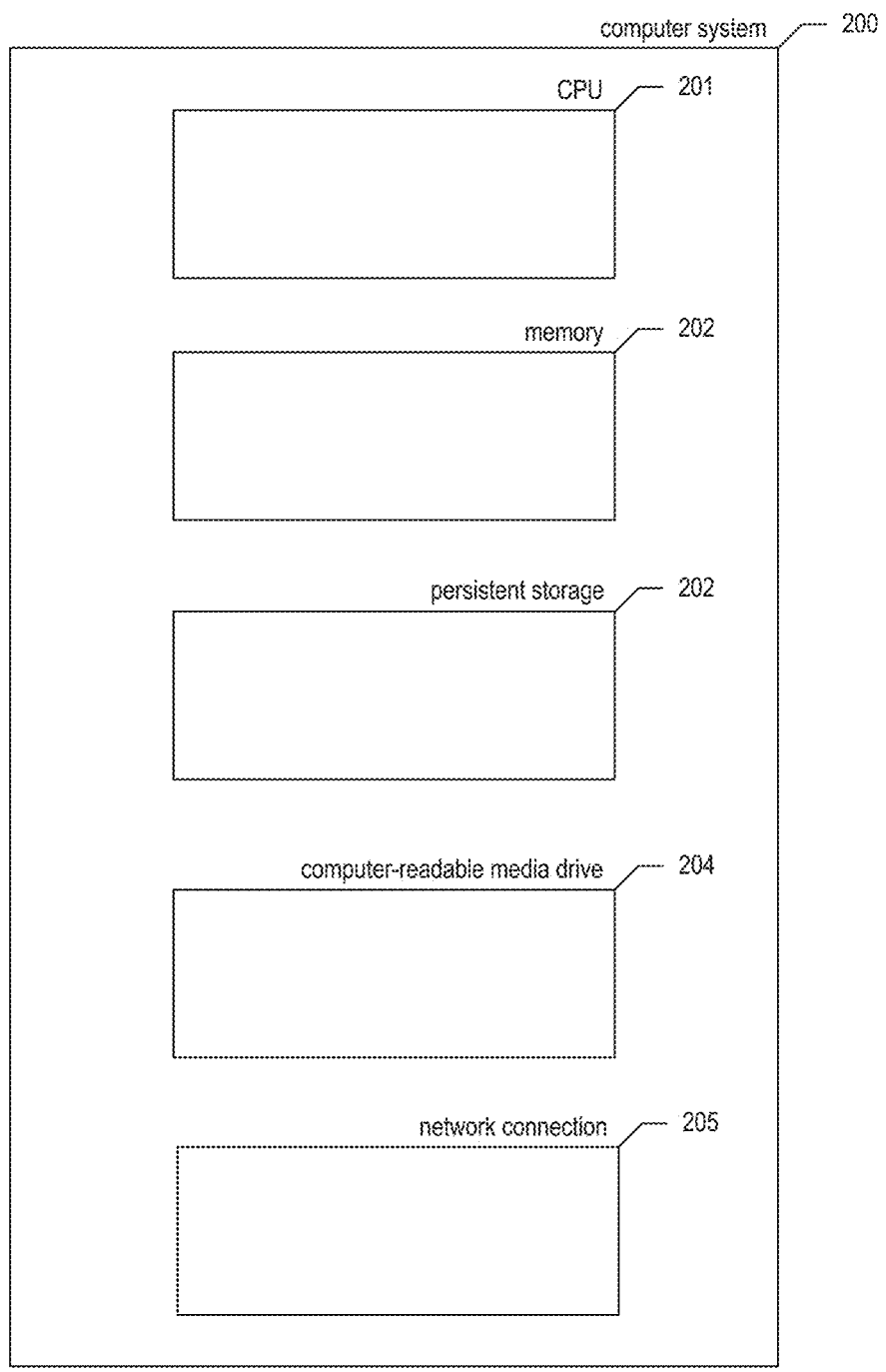
FIG. 2 is a block diagram showing some of the components typically incorporated in at least some of the computer systems and other devices on which the facility executes.

FIG. 2 is a block diagram showing some of the components typically incorporated in at least some of the computer systems and other devices on which the facility executes. These computer systems and devices 200 may include one or more central processing units ("CPUs") 201 for executing computer programs; a computer memory 202 for storing programs and data while they are being used; a persistent storage device 203, such as a hard drive for persistently storing programs and data; a computer-readable media drive 204, such as a CD-ROM drive, for reading programs and data stored on a computer-readable medium; and a network connection 205 for connecting the computer system to other computer systems, such as via the Internet or another network and its networking hardware, such as switches, routers, repeaters, electrical cables and optical fibers, light emitters and receivers, radio transmitters and receivers, and the like. While computer systems configured as described above are typically used to support the operation of the facility, those skilled in the art will appreciate that the facility may be implemented using devices of various types and configurations, and having various components. While computer systems configured as described above are typically used to support the operation of the facility, those skilled in the art will appreciate that the facility may be implemented using devices of various types and configurations, and having various components.

Figure 3:
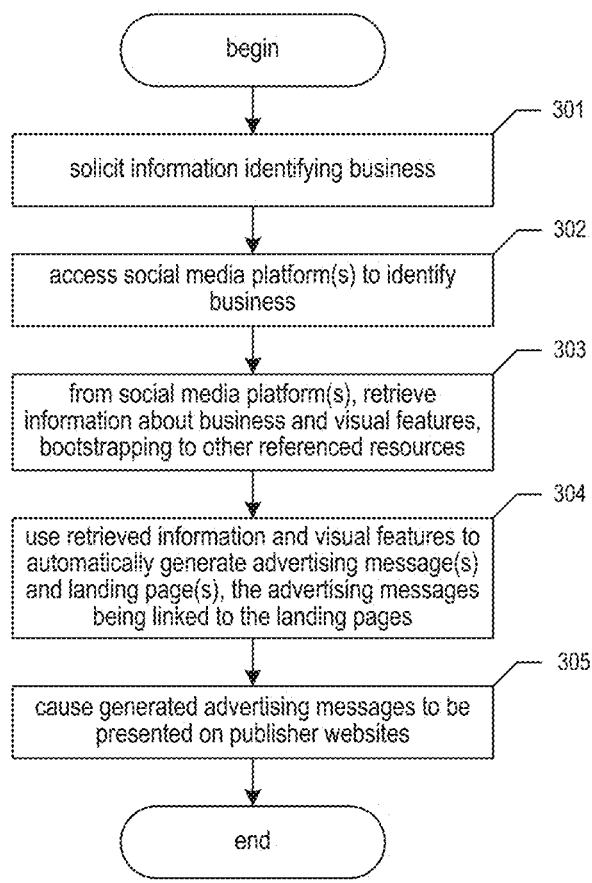
FIG. 3 is a flow diagram showing a process performed by the facility in some embodiments to automatically generate advertising message and associated landing pages.

FIG. 3 is a flow diagram showing a process performed by the facility in some embodiments to automatically generate advertising messages and associated landing pages. In act 301, the facility solicits information identifying a business for which the advertising messages and landing pages are to be generated. In act 302, the facility uses the information received in step 301 to access one or more social media platforms to identify the business among the businesses that have a presence on those social media platforms. In a variety of embodiments, the facility accesses a variety of social media platforms, including, as examples, Facebook, Twitter, Google+, Instagram, and Yelp.

Figure 4:
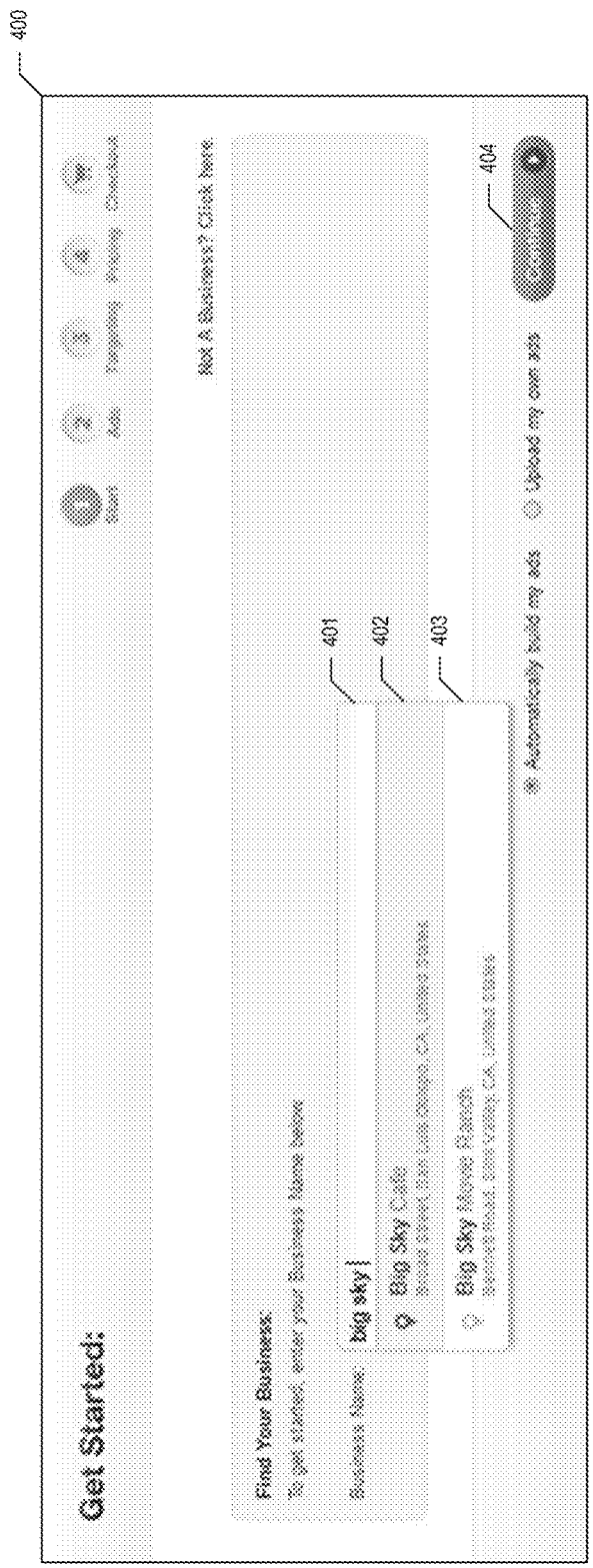
FIG. 4 is a display diagram showing an example of the facility's identification of the business for which advertising messages and landing pages are to be generated.

FIG. 4 is a display diagram showing an example of the facility's identification of the business for which advertising messages and landing pages are to be generated. The display 400 includes a field 401 into which the user can enter the name of the business, or a portion thereof. After searching one or more social media platforms, the facility displays matches 402 and 403, and the user can select match 402 in order to specify the "Big Sky Cafe" business.

In various embodiments, the interactions performed by the facility with respect to the social media platforms involve access to the content stored by each platform via an application programming interface ("API") exposed by the platform, and/or by simulating user interactions with the platform by, for example, posting form contents, receiving web page source in return, and parsing the received web page source to extract the relevant information therein. For example, in some embodiments, the facility uses the Graph API exposed by Facebook, described at developers.facebook.com/docs/graph-api, to access content stored in the Facebook social media platform. In many cases, other social media platforms expose similar APIs.

Returning to FIG. 3, in act 303, the facility retrieves from one or more social media platforms information about the business identified in act 302, as well as visual features that are prominent or present in the business's presence on these platforms. In some embodiments, the facility performs this retrieval in a "bootstrapping" mode, in which the facility identifies in the information retrieved from social media platforms references to other resources, such as the business's presence on other social media platforms, the business's website, the business's entry in a trade directory, etc. As part of the bootstrapping, the facility uses these references to access the referenced additional resources, and retrieve information about the business and visual features from these additional sources. In some cases, such bootstrapping can proceed recursively through multiple cycles.

Figure 5:
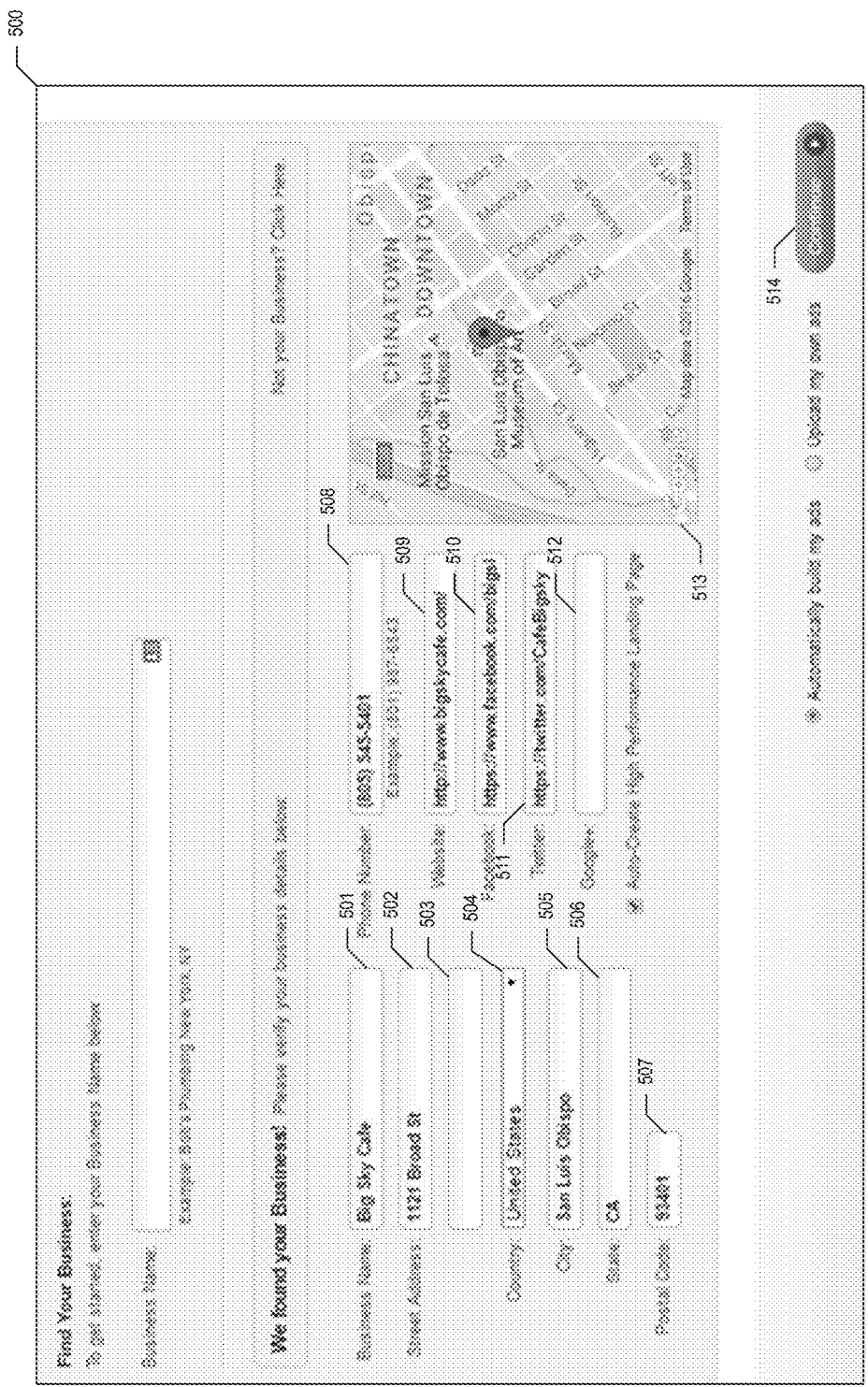
FIG. 5 is a display diagram showing a sample display presented by the facility in some embodiments to show information retrieved about the business.

FIG. 5 is a display diagram showing a sample display presented by the facility in some embodiments to show information retrieved about the business. The display 500 includes fields 501-512 showing the business's name and address, phone number, and URLs for the business's website and presence on several social media platforms. The display also includes a map 513 plotting the business's street address, and a continue control 514 that the user can select in order to advance the user interface.

Figure 6:
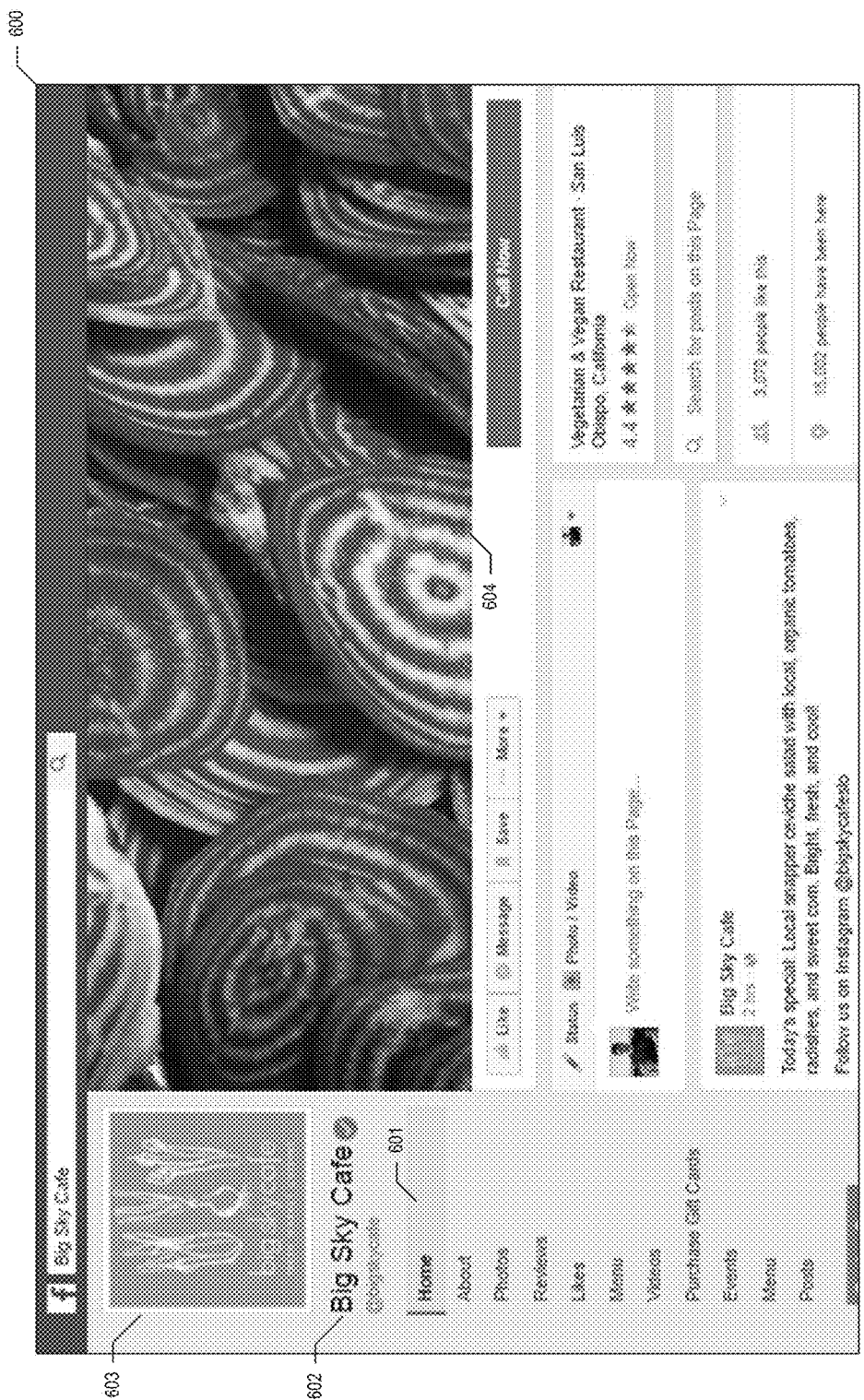
FIGS. 6-8 are content diagrams showing portions of the business's presence on a particular social media platform that include content retrieved by the facility.
Figure 7:
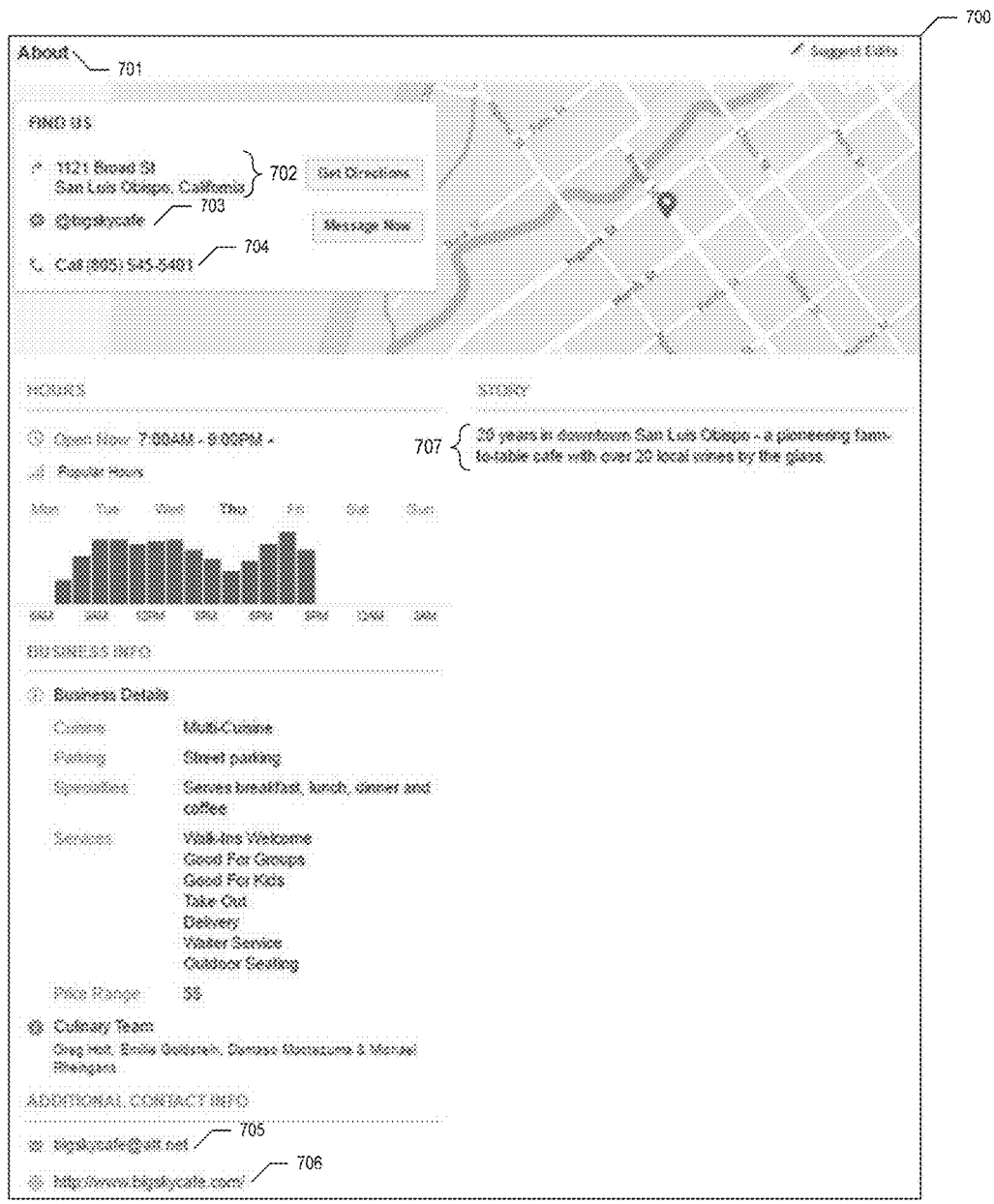
Figure 8:
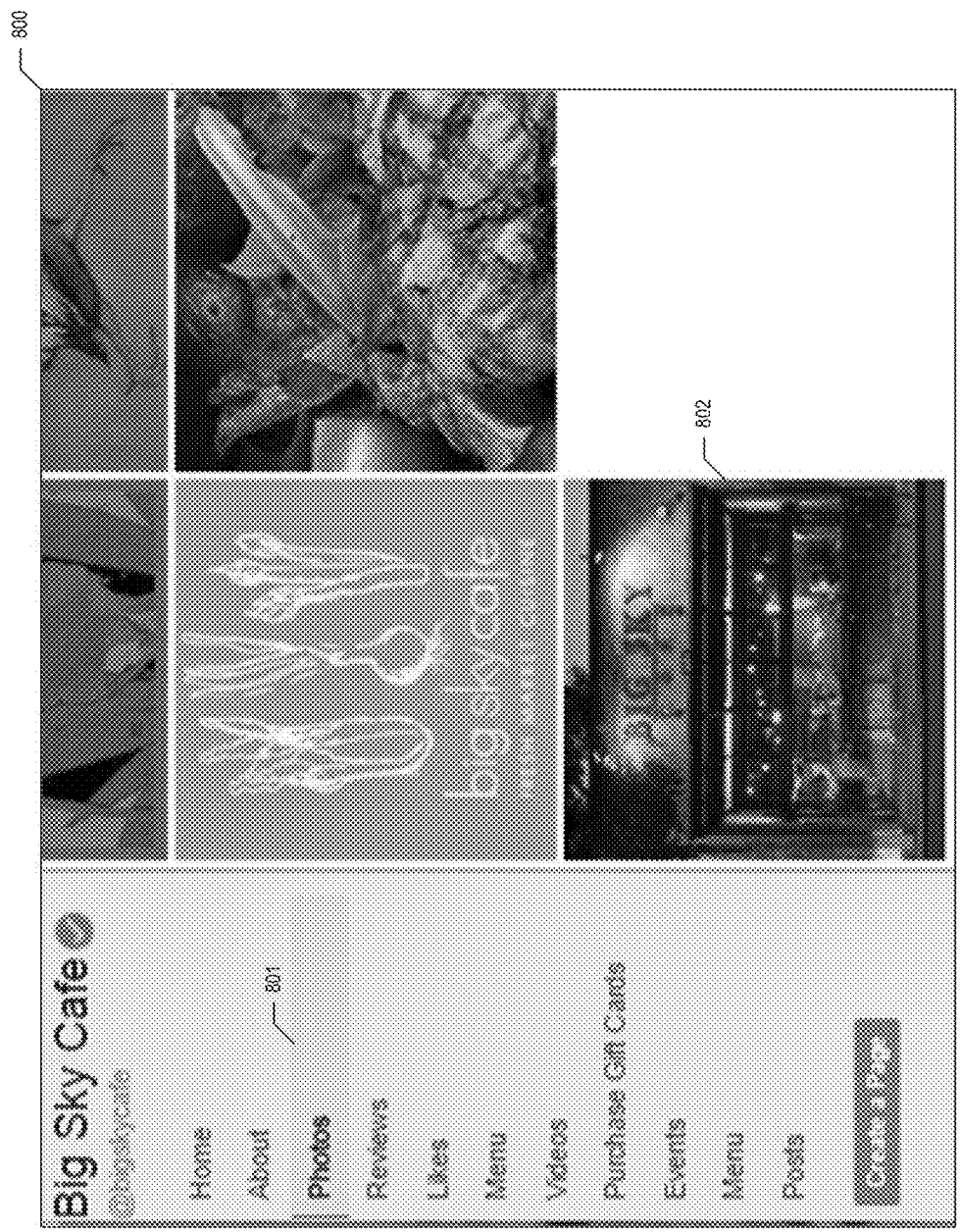

FIGS. 6-8 are content diagrams showing portions of the business's presence on a particular social media platform that include content retrieved by the facility for the borrowers. FIG. 6 shows a "home" section of the business's presence, which includes a name 602, a logo 603 retrieved by the facility and a cover photo 604 for the business retrieved by the facility. FIG. 7 shows an "about" section of the business's presence, which includes the following information about the business retrieved by the facility: street address 702; Messenger address 703; telephone number 704; email address 705; web page URL 706; and description 707. FIG. 8 shows a "Photos" section of the business's presence, which includes a photo 802 retrieved by the facility.

As an example of bootstrapping, the facility uses the web page URL 706 retrieved by the facility from the social media presence for the business to access the business's website.

Figure 9:
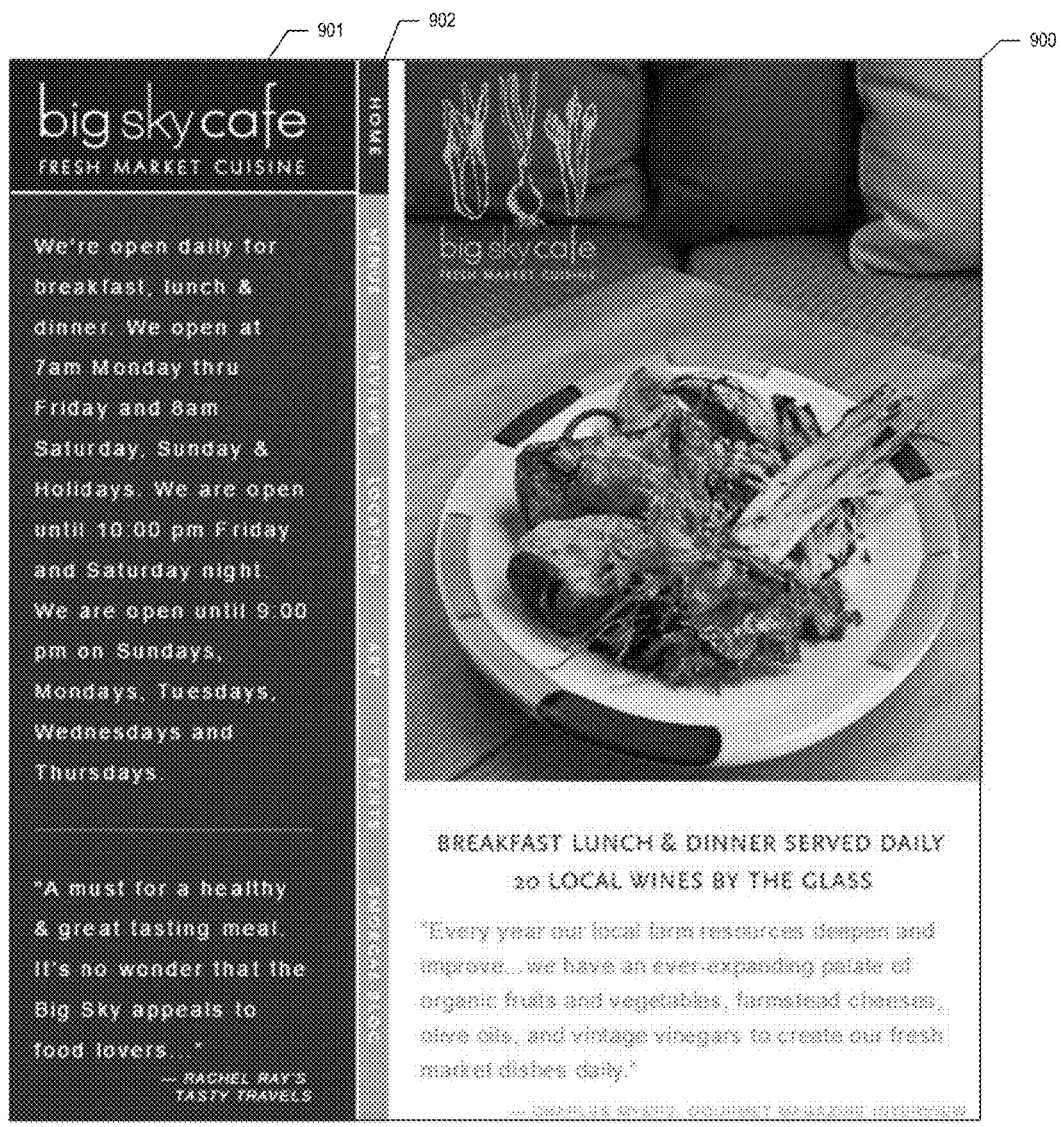
FIG. 9 is a content diagram showing a portion of the business's website that includes content retrieved by the facility.

FIG. 9 is a content diagram showing a portion of the business's website that includes content retrieved by the facility. In some embodiments, the facility performs this process by retrieving one or more pages from the business's website, and lexically parsing and/or otherwise analyzing the web page source that is returned by the website. The content 900 includes a region 901 whose background color used is by the facility in generating advertising message in landing pages; and a region 902 whose background and text colors are also used by the facility in generating advertising message in landing pages.

Figure 10:
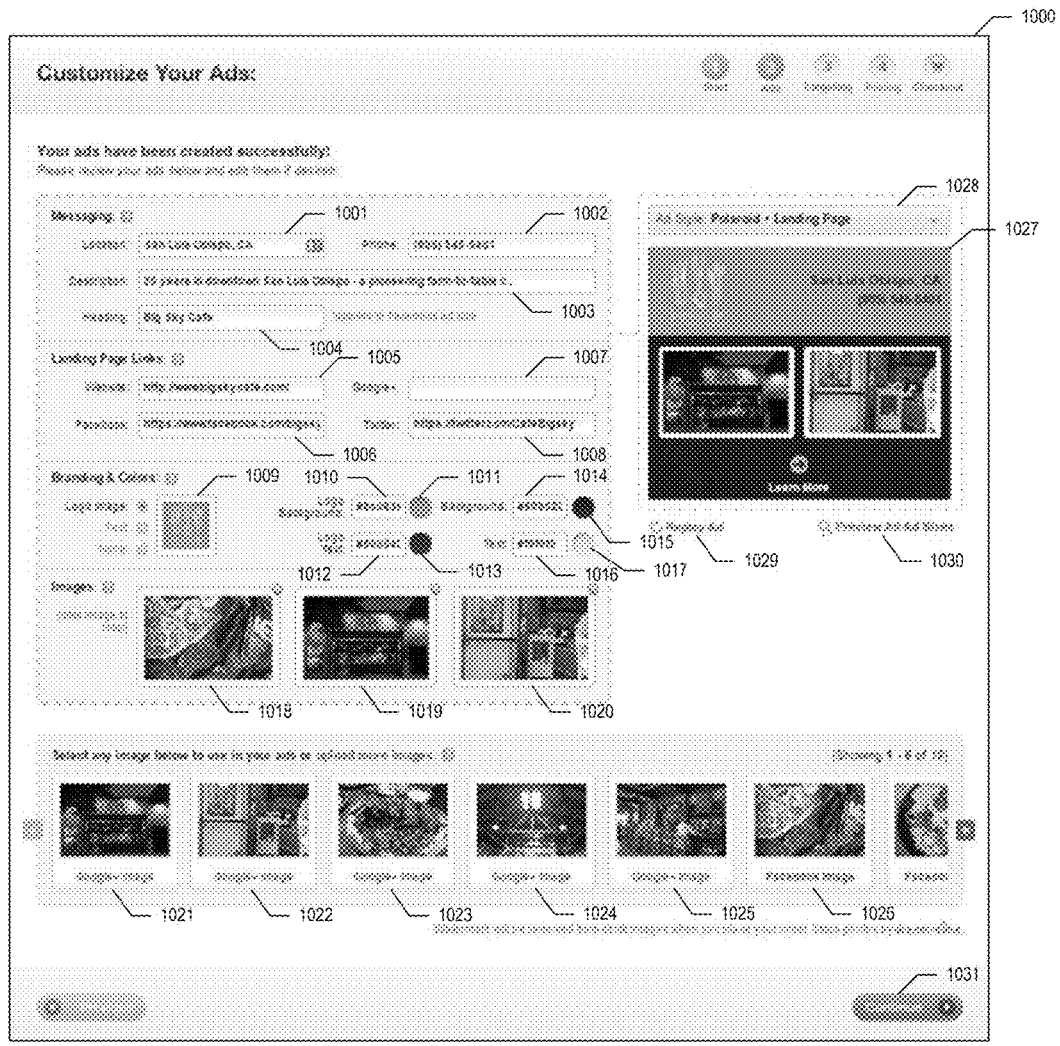
FIG. 10 is a display diagram showing sample contents of a user interface presented by the facility in some embodiments to present to the user the information and visual features retrieved by the facility that it intends to use in generating advertising messages in landing.

FIG. 10 is a display diagram showing sample contents of a user interface presented by the facility in some embodiments to present to the user the information and visual features retrieved by the facility that it intends to use in generating advertising messages in landing. The display 1000 identifies the following information and visual features that it proposes to include in the generated advertising messages and landing pages: physical location 1001—retrieved from the social media presence shown in information 702; phone number 1002—retrieved from the social media presence shown in information 704; description 1003—retrieved from the social media presence shown in information 707; heading 1004—retrieved from the social media presence shown in information 602; URL 1005 to be used in the link to the business's website—retrieved from the social media presence shown in information 706; URL 1006 to be used in the link to the business's presence on the Facebook social media platform—returned by a call to the Facebook Graph API; URL 1007 to be used in the link to the business's presence on the Google+social media platform; URL 1008 to be used in the link to the business's presence on the Twitter social media platform—returned by a call to the Facebook Graph API; logo image 1009—retrieved from the social media presence shown in information 603; numerical value 1010 and color chip 1011 for a logo background color—retrieved from the social media presence shown in information 605; numerical value 1012 and color chip 1013 for a logo text color—retrieved from region 901; numerical value 1014 and color chip 1015 for a background color—retrieved from region 902; numerical value 1016 and color chip 1017 for a text color—retrieved from region 902; images 1018, 1019, and 1020 presently selected for inclusion in the advertising messages and landing pages—retrieved as photos 604, 802, and a photo retrieved from the Twitter social media platform (not shown); candidate images 1021-1026 that the user can select to augment or replace the selected images; a preview 1027 of how a particular type of the automatically generated ads will look based upon information and visual features 1001-1020; a control 1028 for selecting the advertising message type whose preview is shown at 1027; a replay ad control 1029 to restart a time-indexed progression in the display of the advertising message preview, such as a video, an animation, a slide show presentation, etc.; a preview all ad sizes control 1030 that the user can select in order to display previews of each of the types of advertising message that will be generated. The display also includes a continue control 1031 that the user can activate in order to proceed to place an order to purchase advertising space on publisher websites for presenting the generated advertising messages.

Figure 11:
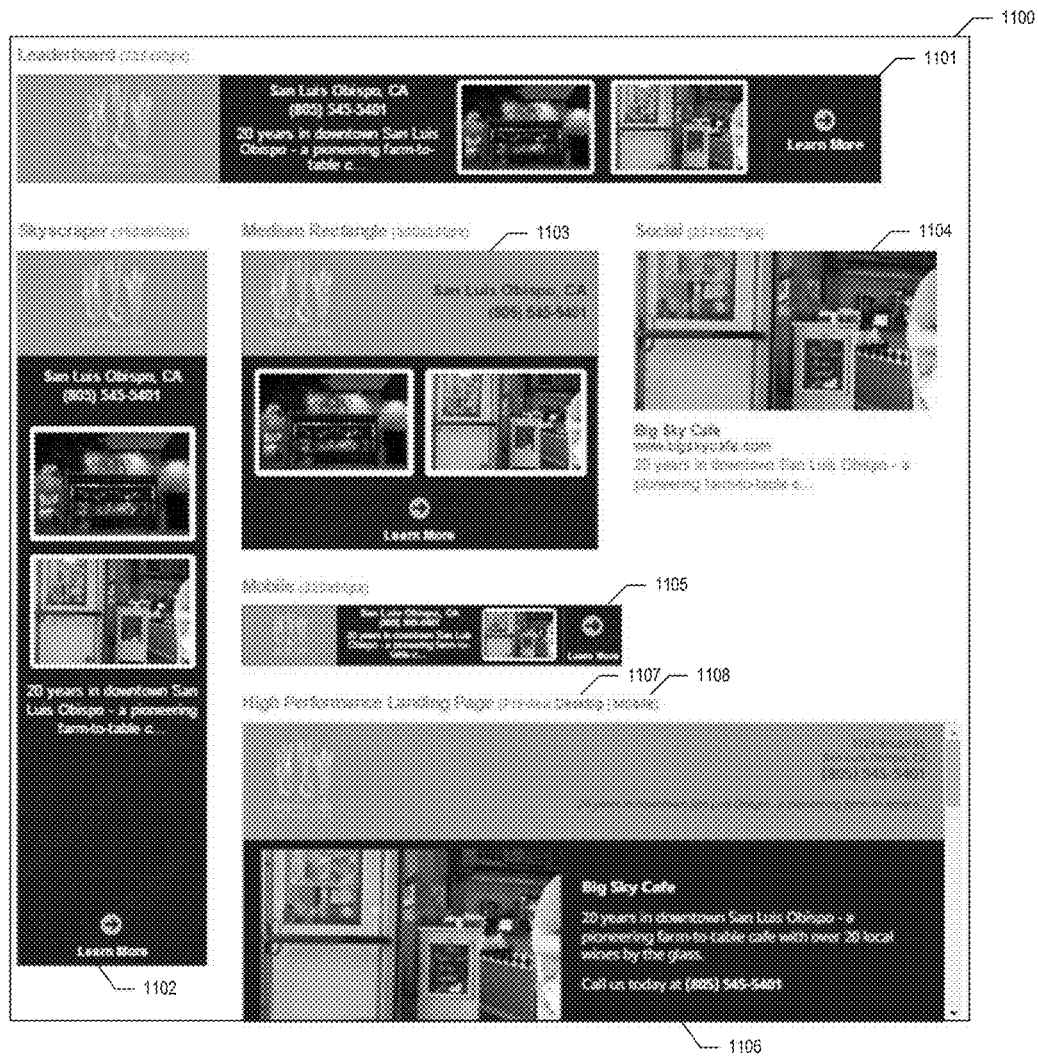
FIG. 11 is a display diagram showing sample contents of a user interface presented by the facility in some embodiments when the preview all ad sizes control 1030 shown in FIG. 10 is activated.

FIG. 11 is a display diagram showing sample contents of a user interface presented by the facility in some embodiments when the user activates the preview all ad sizes control 1030 shown in FIG. 10. The display 1100 includes a preview 1101 of a "Leaderboard" version of the advertising message; a preview 1102 of a "Skyscraper" version of the advertising message; a preview 1103 of a "Medium Rectangle" version of the advertising message; a preview 1104 of a "Social" version of the advertising message; and a preview 1105 of a "Mobile" version of the advertising message. The display also includes a small preview 1106 of the landing page generated by the facility for the business. It is accompanied by desktop control 1107 and mobile control 1108, each of which can be activated to display a more complete preview of the versions of the landing page designed for display on desktop devices and mobile devices, respectively.

Figure 12:
FIG. 12 is a display diagram showing a sample preview of the desktop version of the landing page.

FIG. 12 is a display diagram showing a sample preview of the desktop version of the landing page. The preview 1200 includes information and visual features retrieved by the facility for the business. It includes a logo 1201 for the business extracted from social media presence shown in FIG. 6; the color 1202 that is the background of the business's logo in the social media presence; the business's address 1203; its telephone number 1204; a description 1205; a photo 1206 retrieved from a social media platform; a background color 1207 retrieved from the business's webpage; the business's name 1208; its description 1209; its phone number 1201; its name 1211; its street address 1212; its phone number 1213; the URL 1214 of its web page; links 1215 and 1216 to its social media presences; a photo 1217 retrieved from its social media presence; and a map 1218 plotting the business's street address.

Figure 13:
FIG. 13 is a display diagram showing sample preview of the mobile version of the landing page preview.

FIG. 13 is a display diagram showing sample preview of the mobile version of the landing page preview. The preview 1300 includes logo 1301; background color from the logo 1302; street address 1303; telephone number 1304; description 1305; photo 1306; background color 1307; business name 1308; description 1309; and phone number 1310.

Returning to FIG. 3, in act 304, the facility uses the information and visual features retrieved for the business in act 303 to automatically generate one or more advertising messages for the business and one or more associated landing pages. The generating advertising messages are linked to the landing pages, in that, when the user selected them, the landing pages are retrieved and displayed to the user. In act 305, the facility causes the advertising messages generating the act 304 to be presented on the websites of one or more publishers. In some embodiments, these publishers can include social media platforms. After act 305, this process concludes.

Those skilled in the art will appreciate that the steps shown in FIG. 3 and in each of the flow diagrams discussed below may be altered in a variety of ways. For example, the order of the steps may be rearranged; some steps may be performed in parallel; shown steps may be omitted, or other steps may be included; a shown step may be divided into substeps, or multiple shown steps may be combined into a single step, etc.

Figure 14:
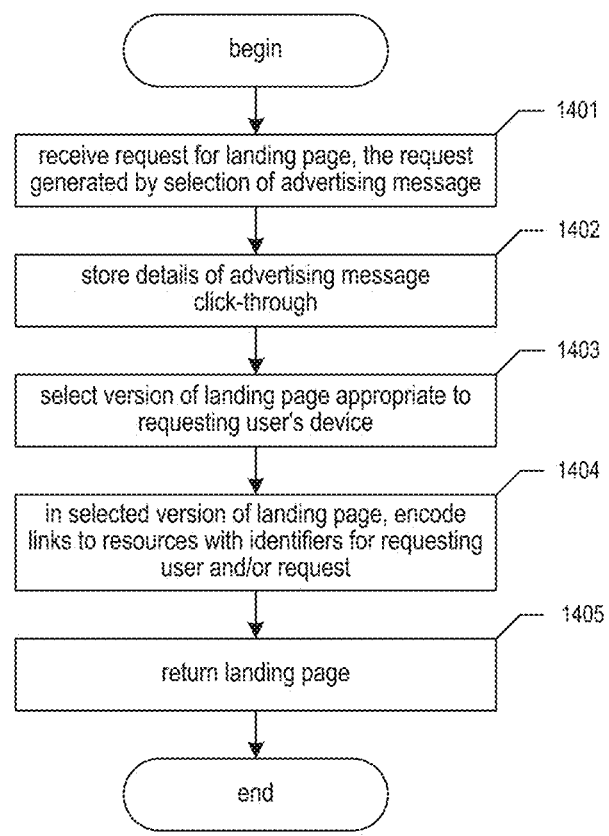
FIG. 14 is a flow diagram showing a process performed by the facility in some embodiments to service landing page requests.

FIG. 14 is a flow diagram showing a process performed by the facility in some embodiments to service landing page requests. In act 1401, the facility receives a request for a landing page. In some embodiments, the request is generated by the selection of the corresponding advertising message by a user to whom the advertising message was presented. In act 1402, the facility stores details of the click-through of the advertising message that was the basis for the request received in act 1401. In act 1403, the facility selects a version of the landing page as appropriate for the user device that originated the request, such as by selecting between a mobile and desktop version of the landing page. In some embodiments, the facility performs act 1403 based on the contents of a user-agent field received as part of the request received in act 1401. In step 1404, in the version of the landing page selected in act 1403, the facility encodes the links to various recourses that are in the in the landing page with identifiers for the user whose device sent the request, and/or for the particular request itself. In some embodiments, these links are to URLs in the Internet domain in which the facility operates, allowing the facility to receive, register, and satisfy or redirect the requests that result from dereferencing them. These resources include, for example, the business's website; its social media presences; a map or directions based on its address or a phone call based upon its phone number; etc. The encoded identifiers are later used by the facility to correlate click-throughs to these resources that the user performs while viewing the landing page. In act 1405, the facility returns to the landing page as augmented in act 1404. After act 1405, this process concludes.

Figure 15:
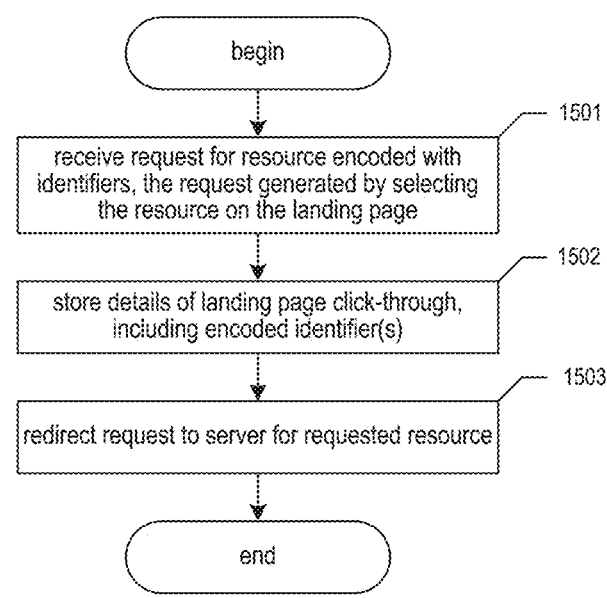
FIG. 15 is a flow diagram showing a process performed by the facility in some embodiments to service requests for resources that originate with the landing page.

FIG. 15 is a flow diagram showing a process performed by the facility in some embodiments to service requests for resources that originate with the landing page. In act 1501, the facility receives a request for a resource that was generated by selecting a resource on the landing page. The request is encoded with identifiers that identify the user and/or the user's particular click-through of the advertising message. The request is received by the facility based upon the facility having originally established the links to point to the Internet domain in which the facility operates. In act 1502, the facility stores details of the landing page click-through that include the encoded identifiers. In act 1503, the facility redirects the request to the server that can actually provide the requested resource. For example, where the request is for the business's webpage, then the facility redirects the request to the URL for the business's webpage. After act 1503, this process concludes.

Figure 16:
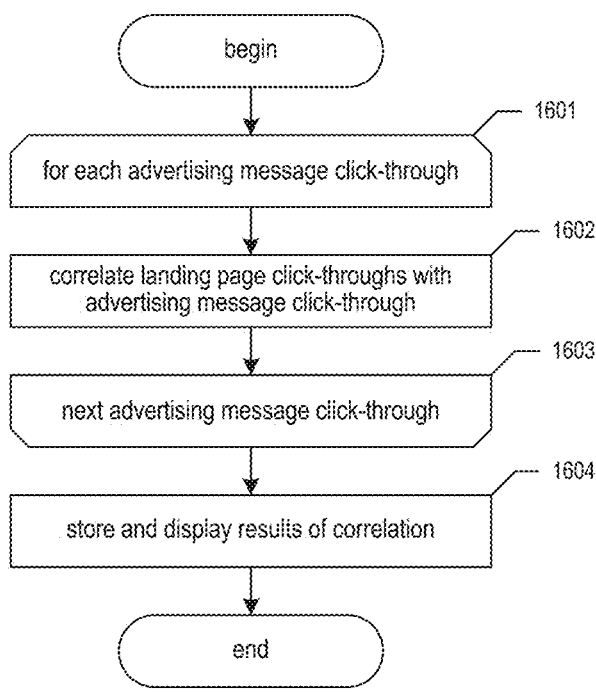
FIG. 16 is a flow diagram showing a process performed by the facility in some embodiments to associate a user's click-throughs on an advertising message with actions he or she subsequently takes with respect to the landing page.

FIG. 16 is a flow diagram showing a process performed by the facility in some embodiments to associate a user's click-throughs on an advertising message with actions he or she subsequently takes with respect to the landing page. In acts 1601-1603, the facility loops through each advertising message click-through for which information was stored in act 1402. In act 1602, the facility correlates with the current advertising message click-through any landing page click-throughs that subsequently occurred for which details were stored in act 1502. In act 1603, if additional advertising message click-throughs remain to be processed, then the facility continues in act 1601 to process the next advertising message click-through, else the facility continues in act 1604. In act 1604, the facility stores and/or displays the results of the correlation performed in act 1602. After act 1604, this process concludes.

It will be appreciated by those skilled in the art that the above-described facility may be straightforwardly adapted or extended in various ways. While the foregoing description makes reference to particular embodiments, the scope of the invention is defined solely by the claims that follow and the elements recited therein.

I claim:

1. A computer-readable medium having contents configured to cause a computing system to perform a method, the method comprising:
    receiving text from a user;
    accessing a social media platform to identify a company having a presence on the social media platform and identifying information that includes the received text;
    retrieving content from the identified company's presence on the social media platform, the content including a text string, an image, a web resource, and a color;
    using the retrieved content to construct a webpage, for the identified company, containing a link to the web resource;
    using the retrieved content to construct an advertising message, for the identified company, separate from the constructed webpage and containing a link to the constructed webpage;
    causing the constructed advertising message to be presented by a publisher;
    receiving a first communication indicating that a user to whom the constructed advertising message was presented selected the constructed advertising message;
    in response to the first communication, serving the constructed webpage;
    receiving a second communication indicating that a user viewing the served webpage selected a link to the web resource; and
    in response to the second communication, causing the web resource to be served to the user viewing the served webpage.

2. A method in a computing system, comprising:
    soliciting from a user information relating to a company;
    accessing a social media platform to identify a company having a presence on the social media platform with whom the solicited information is associated;
    retrieving content from the identified company's presence on the social media platform;
    using the retrieved content to construct a webpage for the identified company; and using the retrieved content to construct an advertising message, for the identified company, separate from the constructed webpage and containing a link to the constructed webpage.

3. The method of claim 2, wherein the retrieved content is text, an image, a link, a color, a font, a web resource, or an audio sequence.

4. The method of claim 2, further comprising:
receiving a request to incorporate the constructed advertising message in a publisher webpage; and
in response to the received request, serving the constructed advertising message.

5. The method of claim 2, further comprising:
receiving a request for the constructed webpage; and
in response to the received request, serving the constructed webpage.

6. The method of claim 5, wherein the retrieved content includes a first reference to a web resource, and the constructed webpage includes a second reference to the web resource,
and wherein the received request for the constructed webpage includes an identifier for the user,
the method further comprising, encoding the identifier into the second reference to the web resource included in the constructed webpage that is served.

7. The method of claim 6, further comprising:
determining that the second reference to the web resource into which the identifier for the user has been encoded in the constructed webpage that is served has been dereferenced; and
correlating the dereferencing of the second reference to the web resource with the request for the constructed webpage.

8. The method of claim 2, further comprising:
receiving user input adjusting the content retrieved from the identified company's presence on the social media platform,
and wherein the webpage or the advertising message is constructed using the retrieved content as adjusted.

9. The method of claim 8, further comprising:
before receiving user input adjusting the content, causing to be displayed a first preview of the webpage or the advertising message that is based on the unadjusted content; and
after receiving user input adjusting the content, causing to be displayed a second preview of the webpage or the advertising message that is based on the adjusted content and differs from the first preview in at least one respect.

10. The method of claim 2, wherein the retrieving is done using an application programming interface exposed by the social media platform.

11. The method of claim 2, wherein the retrieving is done by simulating user interactions with the social media platform.

12. The method of claim 2, further comprising:
retrieving from the identified company's presence on the social media platform a reference to an additional resource relating to the identified company; and
using the retrieved reference to retrieve from the additional resource additional content relating to the identified company,
and wherein the retrieved additional content is used in constructing the webpage or the advertising message.

13. The method of claim 12, wherein the additional resource is a presence of the identified company on a second social media platform.

14. The method of claim 12, wherein the additional resource is a pre-existing webpage for the identified company.

15. One or more instances of computer-readable hardware devices collectively storing a landing page data structure, the landing page data structure comprising:
information directing the presentation of a webpage, the webpage having been automatically generated on behalf of a company, the webpage including content automatically retrieved from a social media platform presence of the company,
such that, when an advertising message referencing the landing page data structure is selected by a user, the contents of the landing page data structure are usable to present the webpage to the user selecting the advertising message, the advertising message having been automatically generated on behalf of the company and being separate from the automatically generated webpage, the advertising message including content automatically retrieved from the social media platform presence of the company.

16. The one or more instances of computer-readable hardware devices of claim 15, wherein the landing page data structure includes a link to a resource for the company, the link encoded to, when dereferenced, provide information relating its dereferencing to an earlier presentation of the webpage.

17. The one or more instances of computer-readable hardware devices of claim 15, wherein the contents included in the webpage that was automatically retrieved from the social media platform presence of the company comprise at least one display color.

18. The one or more instances of computer-readable hardware devices of claim 15, wherein the contents included in the webpage that was automatically retrieved from the social media platform presence of the company comprises at least one image.

19. The one or more instances of computer-readable hardware devices of claim 15, wherein the contents included in the webpage that was automatically retrieved from the social media platform presence of the company comprises at least one text string.

20. The one or more instances of computer-readable hardware devices of claim 15, wherein the contents included in the webpage that was automatically retrieved from the social media platform presence of the company comprises at least one link.

21. The one or more instances of computer-readable hardware devices of claim 15, further storing an advertising message data structure, the advertising message data structure comprising:
information directing the presentation of an advertising message, the advertising message having been automatically generated on behalf of the company, the advertising message including content automatically retrieved from the social media platform presence of the company,
such that, in response to an advertising opportunity on a publisher webpage requested by a user, the contents of the advertising message data structure are usable to present the advertising message to the user requesting the publisher webpage.

22. The computer-readable medium of claim 1, wherein using the retrieved content to construct a webpage for the identified company containing a link to the web resource comprises constructing a webpage that includes the retrieved text string, the retrieved image, and the retrieved color.

* * * * *